United States Patent
Leighton et al.

(10) Patent No.: US 10,046,540 B2
(45) Date of Patent: Aug. 14, 2018

(54) LIGHT WEIGHT TEMPERATURE RESISTANT TRANSPARENT LAMINATE STRUCTURE

(75) Inventors: Katherine T Leighton, Media, PA (US); Edgar L Aleshire, Chesapeake City, MD (US); Wiktor Serafin, Newark, DE (US); Christopher M Snively, Clarks Summit, PA (US); Carsten Weinhold, Scranton, PA (US); Theodore A Wegert, Louisville, KY (US); Kurt Schaupert, Hofheim (DE)

(73) Assignee: ORAN SAFETY GLASS INC., Emporia, VA (US)

( * ) Notice: Subject to any disclaimer, the term of this patent is extended or adjusted under 35 U.S.C. 154(b) by 1001 days.

(21) Appl. No.: 13/452,424

(22) Filed: Apr. 20, 2012

(65) Prior Publication Data

US 2012/0269995 A1    Oct. 25, 2012

Related U.S. Application Data

(60) Provisional application No. 61/478,299, filed on Apr. 22, 2011.

(51) Int. Cl.
*B32B 7/04* (2006.01)
*B32B 7/02* (2006.01)
(Continued)

(52) U.S. Cl.
CPC .............. *B32B 7/04* (2013.01); *B32B 7/02* (2013.01); *B32B 7/12* (2013.01); *B32B 17/04* (2013.01);
(Continued)

(58) Field of Classification Search
CPC ... B32B 17/04; B32B 17/10; B32B 17/10064; B32B 17/10119; B32B 7/12
(Continued)

(56) References Cited

U.S. PATENT DOCUMENTS 3,634,177 A    1/1972 Glasser
4,243,719 A *  1/1981 Holmes ................ B32B 17/10
                                              156/106

(Continued)

FOREIGN PATENT DOCUMENTS

WO    2009042877       4/2009
WO    2009042877 A2    4/2009
(Continued)

OTHER PUBLICATIONS

Cambridge University Engineering Department, Materials Data Book, 2003, p. 11.*

(Continued)

*Primary Examiner* — Samir Shah
*Assistant Examiner* — Alicia J Sawdon
(74) *Attorney, Agent, or Firm* — Ohlandt, Greeley, Ruggiero & Perle, L.L.P.

(57) ABSTRACT

A transparent laminate structure is provided that includes a front section, a rear section, and a middle section securing the front and rear sections to one another with a gap therebetween. The front section has a strike face formed of an impact resistant layer and a polymer backing layer bonded to the impact resistant layer by an interlayer. The rear section has a forward face comprising at least one polymer layer. The front and middle sections can form an integral subassembly.

22 Claims, 4 Drawing Sheets (51) Int. Cl.
  *B32B 27/36*   (2006.01)
  *B32B 27/40*   (2006.01)
  *B32B 17/04*   (2006.01)
  *B32B 17/10*   (2006.01)
  *F41H 5/04*    (2006.01)
  *B32B 7/12*    (2006.01)
  *B32B 27/08*   (2006.01)
  *B32B 27/30*   (2006.01)

(52) U.S. Cl.
  CPC .. *B32B 17/10018* (2013.01); *B32B 17/10064* (2013.01); *B32B 17/1077* (2013.01); *B32B 17/10119* (2013.01); *B32B 27/08* (2013.01); *B32B 27/30* (2013.01); *B32B 27/365* (2013.01); *B32B 27/40* (2013.01); *F41H 5/0407* (2013.01); *B32B 2307/412* (2013.01); *B32B 2307/51* (2013.01); *B32B 2307/558* (2013.01); *B32B 2333/12* (2013.01); *B32B 2369/00* (2013.01); *B32B 2571/02* (2013.01); *Y10T 428/239* (2015.01); *Y10T 428/24967* (2015.01); *Y10T 428/31507* (2015.04)

(58) Field of Classification Search
  USPC .................. 296/181.1; 428/215, 34, 412
  See application file for complete search history.

(56) References Cited

U.S. PATENT DOCUMENTS

| | | | | |
|---|---|---|---|---|
| 4,747,896 A | * | 5/1988 | Anastasie | B29C 61/006 156/101 |
| 4,817,347 A | * | 4/1989 | Hand et al. | 52/171.3 |
| 5,060,553 A | * | 10/1991 | Jones | 89/36.02 |
| 5,506,051 A | * | 4/1996 | Levy-Borochov et al. | 428/332 |
| H1567 H | | 8/1996 | Parsons et al. | |
| 6,108,999 A | * | 8/2000 | Smith et al. | 52/786.1 |
| 2003/0087048 A1 | | 5/2003 | Chaussade et al. | |
| 2007/0199259 A1 | * | 8/2007 | Parsley | E06B 3/28 52/203 |
| 2009/0217813 A1 | | 9/2009 | Carberry et al. | |
| 2009/0311449 A1 | * | 12/2009 | Fehlmann et al. | 428/34 |
| 2009/0324935 A1 | * | 12/2009 | Bennison et al. | 428/334 |
| 2010/0275767 A1 | | 11/2010 | Pinckney et al. | |
| 2010/0330341 A1 | | 12/2010 | Percival et al. | |

FOREIGN PATENT DOCUMENTS

WO   WO-2009042877 A2 *  4/2009   ....... B32B 17/10045
WO   WO 2009096930 A1 *  8/2009

OTHER PUBLICATIONS

Kunz et al. (Kunststoffe International Determining the Modulus of Elasticity in Compression via the Shore a Hardness, 2006).*
https://www.merriam-webster.com/dictionary/remove accessed Jun. 22, 2017.*
International Search Report dated Jul. 17, 2012 for PCT application No. PCT/US2012/034509.
Written Opinion dated Jul. 17, 2012 for PCT application No. PCT/US2012/034509.
Extended European Search Report dated Apr. 13, 2015 for European application No. 12773939.9.
International Preliminary Report on Patentability dated Oct. 31, 2013 for PCT application No. PCT/US2012/034509.

* cited by examiner

| Test No. | 2009 | 10018 | 10017 | 10028/43 | 10036 | 10077 | 10085/90/175 | 10069 | 10070 | 10096 | 10105 | 10065 | 10066 | 10071 | 10071 | 10089 | 10104 | 10165 |
|---|---|---|---|---|---|---|---|---|---|---|---|---|---|---|---|---|---|---|
| Target ID | 34 | 60 | 61 | 66 | 72 | 78 | 92 | 79 | 82 | 95 | 96 | 76 | 77 | 88 | 90 | 94 | 94.1 | 94.2 |
| Interlayer TMA onset Temperature (deg C)/Hardness (Shore A) | 76/78 | 76/78 | 76/78 | 90/95 | 90/95 | 90/95 | 90/95 | 90/95 | 90/95 | 90/95 | 90/95 | 90/95 | 90/95 | 90/95 | 90/95 | 90/95 | 90/95 | 90/95 |
| Plastic 28-2 thk (in) | none | 0.22 | 0.22 | 0.22 | 0.22 | 0.22 | 0.22 | none | none | none | 0.22 | 0.22 | 0.22 | 0.22 | 0.22 | 0.22 | 0.22 | 0.22 |
| Plastic 28-1 thk (in) | none | none | 0.063 | 0.063 | <.010 | 0.063 | 0.063 | none | none | 0.22 | 0.0063 | 0.063 | 0.063 | 0.0063 | 0.0063 | 0.063 | 0.063 | 0.063 |
| #26 | .500/PC | 0.500/Air | 0.500/Air | 0.500/Air | 0.500/Air | 0.500/Air | 0.500/Air | none | none | 70/0.100 | 70/0.200 | .500/Air | 0.500/Air | 0.500/Air | 0.500/Air | .500/Air | 0.250/Air | 0.323/Air |
| Plastic 38 thk (in) | none | 0.125 | 0.063 | 0.063 | 0.063 | 0.063 | 0.063 | none | none | 0.063 | 0.063 | 0.063 | 0.063 | 0.063 | 0.063 | 0.063 | 0.063 | 0.063 |
| Plastic 48 thk (in) | 0.72 | 0.44 | 0.44 | 0.44 | 0.44 | 0.22 | 0.22 | 0.22 | 0.44 | 0.44 | 0.44 | none | 0.44 | 0.44 | 0.44 | 0.44 | 0.44 | 0.44 |
| Interlayer 44 hardness (shore A)/thk (in) | 78/.025 | none | 78/.025 | none | surfactant | 70/.100 | 70/.100 | 78/.025 | 78/.025 | 70/0.100 | 70/0.100 | 78/.100 | 70/.100 | 70/0.100 | 70/0.100 | 70/.100 | 70/.100 | 70/.100 |
| Plastic 42 thk (in) | 0.063 | none | 0.063 | none | <.010 | 0.125 | 0.063 | 0.063 | 0.063 | 0.063 | 0.125 | 0.125 | 0.125 | 0.125 | 0.125 | 0.125 | 0.125 | 0.125 |
| Bullet Impact at Room Temp - Partials on Shot 4 | 8:8 | 1:3 | 0:3 | 11:11 | 5:8 | 5:7 | 8:8 | 6:8 | 6:7 | 8:8 | 4:4 | 8:8 | 5:5 | 4:4 | 4:4 | 8:8 | 7:8 | |
| Bullet Impact at + 63 deg C - Partials on Shot 4 | | | | | | | 6:8 | | | | 0:4 | | 4:5 | | | 4:4 | 2:5 | 3:5 |
| Bullet Impact at -43 deg C - Partials on Shot 4 | 8:8 | | | | | | 8:8 | | | 4:4 | 2:2 | | 9:9 | | | 4:4 | | |
| Fragment impact at Room temp - Partials | 1:1 | | | 1:1 | | | 4:4 | | 1:1 | 1:1 | 2:2 | 1:1 | 1:1 | | | 2:2 | 1:1 | |
| Fragment impact at + 63 deg C - Partials | 1:1 | | | | | | 4:4 | | | 1:1 | 1:1 | | | | | 1:1 | 1:1 | 0:1 |
| Fragment impact at -32 deg C - Partials | 0:1 | | | | | | 1:1 | 0:1 | 0:1 | | | 0:1 | 1:1 | 1:1 | 1:1 | 1:1 | | |

All targets the same areal density +/- 1.8%

LIGHT WEIGHT TEMPERATURE RESISTANT TRANSPARENT LAMINATE STRUCTURE

CROSS REFERENCE TO RELATED APPLICATIONS

This application claims the benefit of U.S. Provisional Application Ser. No. 61/478,299 filed on Apr. 22, 2011, the entire contents of which are incorporated by reference herein.

BACKGROUND OF THE DISCLOSURE

1. Field of the Disclosure

The present disclosure is related to transparent laminate structures. More particularly, the present disclosure is related to light weight temperature resistant transparent laminate structures used as protective armor.

2. Description of Related Art

Transparent laminate structures are commonly used as transparent protective windows or armor in a variety of industrial and military applications. These laminate structures are typically comprised primarily of glass layers and plastic layers bonded together with polymer interlayers where these interlayers are typically on the order of a magnitude thinner than the glass and plastic layers.

Unfortunately, prior art transparent laminate structures have provided lower than desired protection capabilities from multiple hit threats at desired temperature extremes including low temperatures (e.g., −31 to −43 degrees Celsius) and high temperatures (e.g., 48 to 63 degrees Celsius).

Accordingly, it has been determined by the present disclosure that there is a continuing need for transparent laminate structures that overcome, alleviate, and/or mitigate one or more of the aforementioned and other deleterious effects of prior art transparent laminate structures.

BRIEF SUMMARY OF THE DISCLOSURE

A transparent laminate structure is provided that includes three sections, a front section, a middle section, and a rear section. The middle section defines an area of low density as compared to the front and rear sections.

In some embodiments, a transparent laminate structure subassembly is provided that includes a front section and a middle section. The subassembly is configured for removable assembly to a vehicle having a rear section so that the middle section defines an area of low density between the front and rear sections.

In some embodiments, the structure includes at least one polycarbonate layer bounding each side of the lower density middle section. Here, the rearward face of the front section has at least one polycarbonate layer and the frontward face of the rear section has at least one polycarbonate layer.

In other embodiments, the structure has a rear section that includes at least one plastic spall layer at its rearward face that may or may not be fiber reinforced. The spall layer is bonded to the rear section by relatively thick, soft compliant adhesive layer, which is ductile at low temperatures.

In a preferred embodiment, the structure includes the polycarbonate layer bounding each side of the middle section and a spall layer bonded to the rearward face of the rear section by relatively thick, soft compliant adhesive layer, which is ductile at low temperatures.

The present disclosure provides one embodiment of a light weight temperature resistant transparent laminate structure that has three sections, a front section, a rear section, and a lower density middle section that is bounded on both sides by a polycarbonate layer.

The present disclosure also provides one embodiment of a light weight temperature resistant transparent laminate structure that has three sections, a front section, a rear section, and a lower density middle section that is filled with a transparent liquid or gel.

The present disclosure further provides one embodiment of a light weight temperature resistant transparent laminate structure that has a plurality of sections, where the rearmost section has a polycarbonate layer at the safe side that is bonded to the structure by relatively thick, soft compliant adhesive layer, which is ductile at low temperatures.

Additionally, the present disclosure provides one embodiment of a light weight temperature resistant transparent laminate structure that has a plurality of sections, where at least one of the sections is configured to provide an gap or space between adjacent sections. The gap or space is provided by a spacer having a desired elasticity.

The above-described and other features and advantages of the present disclosure will be appreciated and understood by those skilled in the art from the following detailed description, drawings, and appended claims.

BRIEF DESCRIPTION OF THE SEVERAL VIEWS OF THE DRAWINGS

FIG. 3 is table illustrating testing data transparent laminate structures according to the present disclosure;

DETAILED DESCRIPTION OF THE DISCLOSURE

Figure 1:
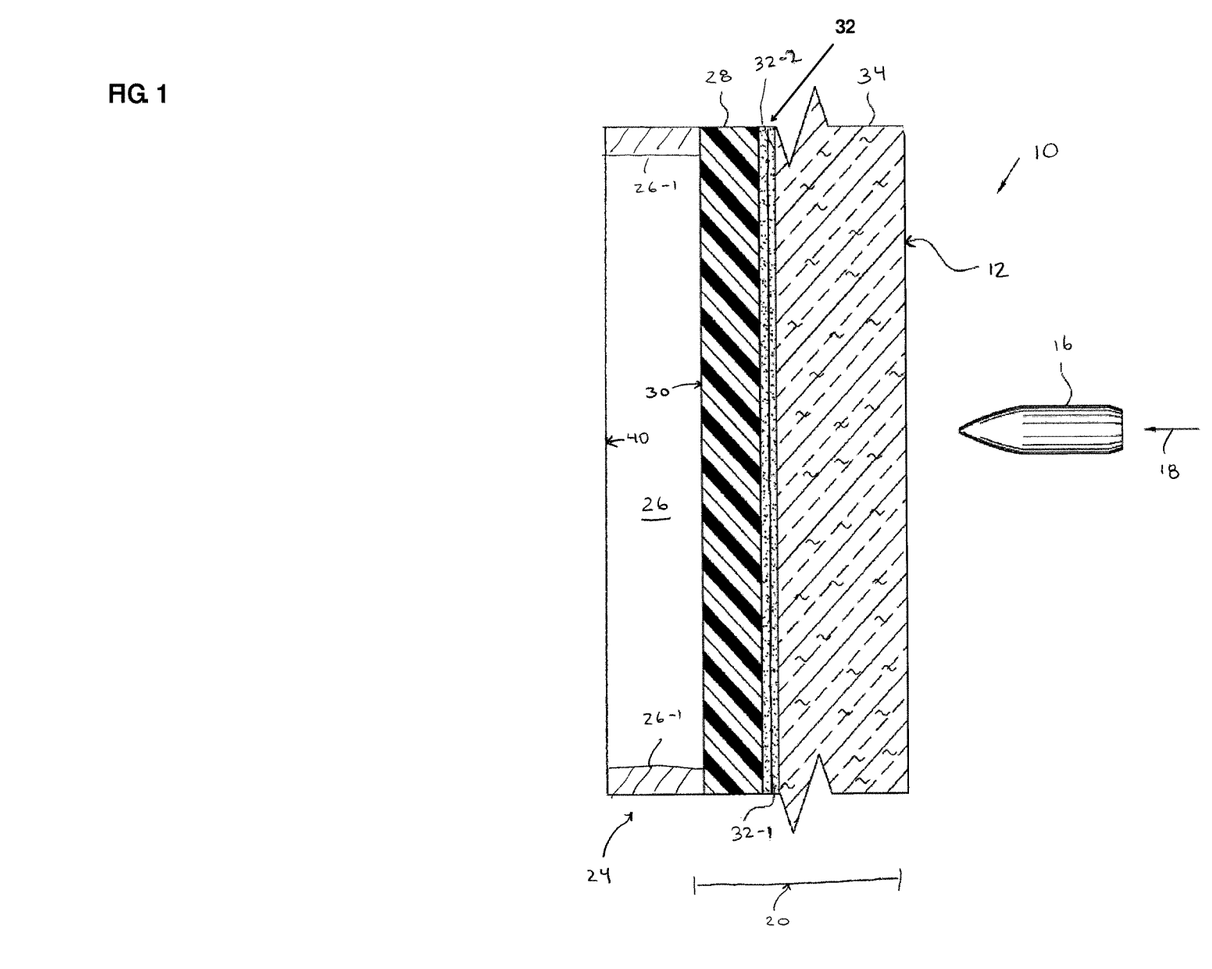
FIG. 1 is a partial sectional view of an exemplary embodiment of a transparent laminate structure according to the present disclosure.
Figure 2:
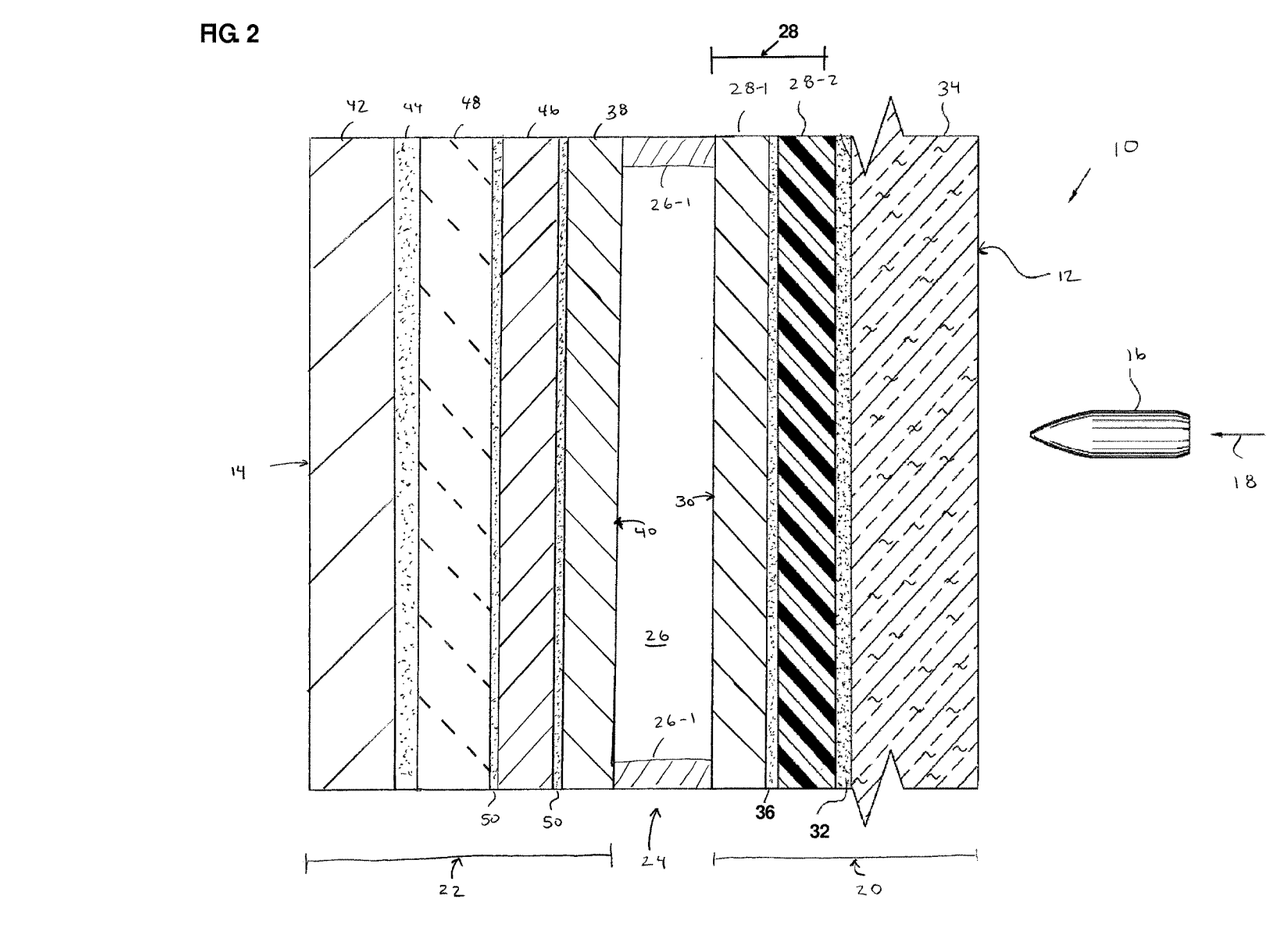
FIG. 2 is a partial sectional view of an alternate exemplary embodiment of a transparent laminate structure according to the present disclosure.

Referring to the drawings and in particular to FIGS. 1 and 2, a transparent laminate structure according to the present disclosure is shown in partial cross section and is generally referenced by reference numeral 10.

In use, structure 10 is exposed to a wide range of kinetic energy threats where harm is imposed on the structure by the mass and velocity of the threat such as, but not limited to, bullets and fragments. As used herein, the term "bullets" shall mean ammunition that is fired from a gun, while the term "fragments" shall mean solid pieces having a variety of materials and shapes that are propelled by an explosive device. Moreover, the threats imposed on structure 10 are not limited to a single strike, but more often than not include multiple strikes.

Without wishing to be bound by any particular theory, it is believed by the present disclosure that each threat type (e.g., bullets and fragments) is optimally defeated by a different set of armor materials and configurations.

However, structure 10 is advantageously configured to defeat multiple threats types, including bullets and fragments, and to defeat multiple strikes from those threat types, particularly at various temperature extremes. Moreover, structure 10 is configured to defeat these threats while maintaining its transparency and providing a minimal weight, typically measured in pounds per square foot (psf).

Structure 10 has a strike face 12 and a safe face 14. Testing and qualification of such structures is almost always performed in a worst case angle of impact, which is assumed to be orthogonal to strike face 12 where the travel of projectiles 16, illustrated by example only as a bullet, is along an axis 18.

Structure 10 is constructed to advantageously provide improved low temperature (e.g., −31 to −43 degrees Celsius) and high temperature (e.g., 48 to 63 degrees Celsius) multi-strike performance as compared to prior art structures.

Structure 10 has at least two sections, a front section 20 and a middle section 24. In some embodiments, structure further includes a rear section 22 that is spaced from front section 20 by middle section 24.

In other embodiments, structure 10 does not include rear section 22, but rather is used in combination with another device such as a vehicle that includes rear section 22. As will be described in more detail below with respect to FIGS. 4 through 6, structure 10 having only front and middle sections 20, 24 is then removably mounted onto rear section 22 in a manner that defines a gap 26 therebetween. In this manner, structure 10 is modular and allows rear section 22 to be installed within the frame of the vehicle, while front section 20 is mounted over the rear section with gap 26 defined between the sections.

Front section 20 is configured to encourage projectile behavior that has been determined by the present disclosure to provide structure 10 with enhanced initial and multi-strike capabilities at temperature extremes. Specifically, front section 20 is configured to encourage turning with respect to axis 18 of the projectiles within the front section. In this manner, front section 20 is configured to turn projectiles, which has been determined by the present disclosure to enhance the capabilities of the front section to defeat initial and subsequent projectiles. By turning initial and subsequent projectiles, front section 20 ensure that any projectiles that penetrate the front section are impacted on rear section 22 in a turned state, which also enhance the capabilities of the rear section to defeat initial and subsequent projectiles.

Further, front section 20 is configured with an advantageous ratio of layer 28 to layer 34 that is optimally effective in slowing down high velocity fragments, thus stopping them completely or presenting a reduced velocity fragment to rear section 22.

Middle section 24 includes spacers 26-1 ensuring gap 26, which combine to provide an area of low density to incoming projectiles, as compared to front and rear sections 20, 22. Preferably, spacer 26-1 hermetically seals gap 26 between front and rear sections 20, 22 to prevent ingress of moisture into structure 10.

It has been determined by the present disclosure that the initial sections (e.g. front and middle sections 20 and 24) in structure 10 should protect subsequent sections (e.g. rear section 22) from breaking so the subsequent sections remain to defeat multiple strikes. Advantageously, middle section 24 of structure 10 provides a low shock impedance section that protects rear section 22 from impact induced shock waves that propagate through the structure due to strikes on front section 20. Further, middle section 24 also ensures that any stretching, bowing, or penetration of front section 20 does not impact rear section 22. With respect to high velocity fragment impact, middle section 24 has been determined to provide lateral venting of the debris from first section 22 thus reducing the mass and kinetic energy that impacts second section 24.

In sum, structure 10 provides front section 20 that enhances the turning of projectiles and provides middle section 24 that absorbs impact induced shock waves propagating within the structure and mitigates front section 20 from impinging on rear section 22, when present. Also, when present, rear section 22 further enhances the turning of projectiles.

The exemplary embodiments of structure 10 illustrated in FIGS. 1 and 2 are provided to discuss these and other properties and advantages of front, middle, and rear sections 20, 24, 22.

In the embodiment illustrated in FIG. 1, front section 20 includes a backing layer 28 at a rearward face 30 of the front section. Rearward face 30 is substantially perpendicular to strike face 12 and the rearward face is immediately adjacent to middle section 24.

In the embodiment illustrated in FIG. 2, backing layer 28 includes first and second layers 28-1 and 28-2 at a rearward face 30 of the front section. Rearward face 30 is substantially perpendicular to strike face 12 and the rearward face is immediately adjacent to middle section 24.

Front section 20 further includes one or more impact resistant layers 34 (only one shown) bonded to backing layer 28 by an interlayer 32. The front most impact resistant layer 34, which form strike face 12, is formed of a material such as, but not limited to borosilicate glass, glass-ceramic, transparent ceramic, brittle transparent polymers such as, but not limited to polymethyl methacrylate (PMMA), transparent polymers having a surface coating such as, but not limited to Exatec® coating commercially available from SABIC plastics, and hard coated glass, glass-ceramic, or transparent ceramic.

Without wishing to be bound by any particular theory, it is believed by the present disclosure that backing layer 28 takes a more major role in stopping projectiles in fragment form than impact resistant layer 34, while the impact resistant layer takes a more major role in stopping projectiles in bullet from than the backing layer. Thus, it has been determined by the present disclosure that backing layer 28 is particularly effective when made of polycarbonate or the fiber reinforced transparent polymers. Examples of fiber reinforced transparent polymers contemplated by the present disclosure for use as backing layer 28 include, but are not limited to, high strength glass fibers reinforcing a transparent polymer where interfaces between the fiber and the polymer have been treated to match indices of refraction sufficient for transparency. Fiber shape may also be made elliptical for better transparency. Silsesquioxane coatings on the glass fibers enhance transmission in polyurethane and epoxy polymers.

Preferably, the front most layer 34, which forms strike face 12, is made of borosilicate glass having a thickness of about 0.25 to 0.43 inches, or glass-ceramic having a thickness of about 0.30 inches. Other glasses such as surface hardened soda lime silicate, lithium aluminosilicate, and aluminosilicate may also be used. Without limiting the scope of the present disclosure, suitable glass ceramic materials include those having a crystalline phase of Beta-quartz, spinel, Beta-willemite, forsterite, spinel solid solution, mullite, and similar glass ceramics known in the art may also be used. With surface strengthening treatments they may be as thin as 0.118 inches (i.e., 3 millimeters). The glass types, thicknesses, and surface treatment of layer 34 that forms strike face 12 are selected to resist abrasion and chipping from small article impact, and cracking from thermal mechanical stresses.

It should be recognized that front section 20 is shown by way of example only as having a single layer 34. However, it is contemplated by the present disclosure for front section 20 to have any desired number of layers 34 and for these layers to be formed of any desired material. Preferably, structure 10 includes front section 20 having a plurality of layers 34 that use dissimilar thicknesses of each layer and dissimilar materials in order to provide ballistic stopping power at lighter weight by managing and mitigating impact induced shock waves.

Interlayer 32 can be made of any desired transparent adhesive such as, but not limited to aliphatic polyether polyurethanes or poly(vinyl butyral)s, ethylene/methacrylic acid copolymer, silicone, epoxies, and any combinations thereof.

Some embodiments, as shown in FIG. 1, interlayer 32 can be a hybrid interlayer having two layers 32-1 and 32-2, respectively. Here, interlayer 32 has first layer 32-1 bonded to layer 34 that forms strike face 12 that has a high modulus of elasticity and second layer 32-2 bonded to backing layer 28 that has a low modulus of elasticity. The modulus of elasticity of polymers is a measure of resistance to deformation under load, as is hardness. As used herein, the term "low modulus" shall mean materials with, for example, a Shore A hardness of 79 or less, and the term "high modulus" shall mean a Shore A hardness of 90 or higher. It has been determined by the present disclosure that hybrid interlayer 32, having differing modulus of elasticity, can compensate for mismatches in coefficients of thermal expansion between layer 34 and backing 28 and can present differing levels of density to projectiles 16 to assist in turning the projectile.

A preferred embodiment of the high modulus of elasticity material of first layer 32-1 includes for example from Huntsman trade named KRYSTALFLEX® PE501, and from Deerfield trade named DURAFLEX® X2260, and from Steven's trade named Urethane AG-9550, and from Solutia Corp trade named Saflex® SG11. A preferred embodiment of the low modulus of elasticity material of second layer 32-2 includes for example from Huntsman trade named KRYSTALFLEX® PE129, PE193, PE3992, PE409, PE429, PE499, and from Deerfield trade named DURAFLEX® A4700, and from Sierracin/Sylmar Corp polyurethanes trade named S-152, S-158, and from Steven's trade named Urethane AG-8451, and from DuPont trade named Buticite®, and from Solutia Corp trade named Saflex® IIIG and HP.

When backing layer 28 includes first and second layers 28-1, 28-2, the layers are bonded to one another by a compliant adhesive interlayer 36. As used herein, the term "compliant" shall mean that the adhesive interlayer 36 has not turned glassy or brittle at the operating temperature. In some embodiments, interlayer 36 is made of high performance aliphatic polyether films commercially available and selected for adequate adhesion to the glass and or plastics even in environmental extremes. In a particular embodiment, interlayer 32 is one of the low modulus films commercially available. The high modulus interlayers provide another particular embodiment that ensures adhesion and delamination resistance in high temperature environments at polycarbonate interfaces. Interlayer 36 preferably has a thickness between 0.015 and 0.025 inches although thinner or thicker may be necessary for other threat levels.

It has been further been determined by the present disclosure that the use of two layers 28-1, 28-2 made of polycarbonate resolves a particular polycarbonate cracking mechanism observed by the present disclosure.

Specifically, the present disclosure has observed that polycarbonate, when used as backing layer 28 in laminated transparent structure 10, exhibits opaque white bands and fine spherical bubbles on the order of a millimeter or less at the interface between the polycarbonate and the radial cracks in the brittle impact resistant layers 34 (e.g., glass).

Without wishing to be bound by any particular theory, it is believed by the present disclosure that the white bands are indicative of the onset of shearing in the polycarbonate backing layer 28 and consider the presence of the bubbles to be caused by localized regions of heat in the polycarbonate liberating water bubbles in bands akin to adiabatic shearing that takes place in metals under ballistic impacts. When polycarbonate backing layer 28 cracks, it starts on the side of the layer that is next to the impact resistant layers 34 (e.g., glass) at this boundary and the crack extends in a circumferential path.

Structure 10 advantageously resolves and/or mitigates this polycarbonate cracking problem by bonding layer 28-1 to layer 28-2. In this manner, when layer 28-2 is exposed to the cracking discussed above, layer 28-1 is thin enough to stretch rather than shear.

The present disclosure has also determined that bonding of layers 28-1 and 28-2 to one another with compliant adhesive interlayer 36 resolves and/or mitigates propagation of cracks formed in layer 28-2 into layer 28-1.

At low temperatures, polymers become more and more brittle, which has been determined to make the cracking problem in polycarbonate worse. It was a surprising discovery of the current disclosure that even at low temperatures, such as −31 to −43 deg C., a thin, on the order of 0.060" sheet of polycarbonate as backing layer 28-1 when bonded to the rear of the front section 20 with adhesive layer 32 that is compliant at the operating temperature will exhibit stretching rather than brittle cracking and will effectively catch the fractured pieces from the preceding laminate layers of the front section.

When present, layer 28-2, which is in the direction of strike face 12, has a thickness of about 0.50 to about 0.125 inches thick, while layer 28-1, which is in the direction of rearward face 30, has a thickness that is thinner than 0.25 inches, preferably thinner than 0.22 inches, with about 0.060 inches being most preferred.

It has been determined by the present disclosure that the dimensions of backing layer 28, or when present layers 28-1 and 28-2, are important to keep the stresses caused by mismatch of thermal expansion low enough to satisfy the low temperature requirements, while keeping the backing layer 28 thick enough to provide stiffness and support of the fractured glass that is formed after the first impact of projectile 16.

It is also contemplated by the present disclosure for one or more of the layers (e.g., 28, 32, 34, and 36) within front section 20 to include nano-crystals of sufficient size or colorants to block ultraviolet (UV) light. Additionally, it is contemplated by the present disclosure for front section 20 include an additional layer (not shown) that is bonded immediately behind strike face 12, where the additional layer is made of glass-ceramic having nano-crystals of sufficient size to block UV light. Further, it is contemplated by the present disclosure for front section 20 include an additional layer (not shown) that is bonded immediately in front of strike face 12, where the additional layer is a layer of commercially available UV blocking film or coating.

Structure 10 can, via middle section 24, enhance the turning of projectiles 16. For example, it has been determined that the presence of middle section 24 in structure 10 can allow front and/or rear sections 20, 22 to be shaped to enhance projectile turning. For example, middle section 24 can be between two flat sections 20, 22, where the change in density afforded by the middle section can enhance projectile turning.

Middle section 24 can be between shaped sections 20, 22, where the shape of the sections can enhance projectile turning. For example, middle section 24 can be between two curved sections, a curved front section with a flat rear section or a flat front section with a curved rear section.

As discussed above, middle section 24 absorbs impact induced shock waves propagating within the structure. The ability of middle section 24 absorb the shock waves is believed to be dependent upon, among other factors, the material properties of the spacers 26-1, the material properties of any filler within gap 26, and the thickness of the gap.

Middle section 24 includes one or more spacers 26-1 configured to maintain gap 26 to the desired dimension. Gap 26 can have any desired dimension or thickness, which refers to a distance along axis 18. Preferably, gap 26 is between 0.378 and 0.50 inches. Of course, it is contemplated by the present disclosure for gap 26 to have any desired thicknesses sufficient for the intended threat and intended application.

In some embodiments, gap 26 can filled with a transparent gas such as, but not limited to, air, nitrogen, argon, helium, oxygen, carbon dioxide, propane, and any combinations thereof.

In other embodiments, gap 26 can be evacuated of all material to form a vacuum space between front and rear sections 20, 22.

In still other embodiments, gap 26 can be filled with a transparent liquid or gel such as, but not limited to, silicone, index matching gels, hydrogel, polyurethane, and any combinations thereof. Without wishing to be bound by any particular theory, it is believed that filling gap 26 with a region of low modulus, compliant polymer allows the polymer to absorb the energy of the impact by a first projectile 16 such that there is minimal transfer of damage into rear section 22 by this first projectile.

Without wishing to be bound by any particular theory, it is believed by the present disclosure that prior art structures struggled to defeat bullets in high temperature environments, while prior art structures struggled to defeat fragments in low temperature environments. Advantageously, it has surprisingly been determined that middle section 24 provides a degree of freedom to structure 10 that permits improved high and low temperature performance for both bullets and fragments.

In high temperature environments, it is believed that the combination of gap 26, bounded by the thin backing layer 28 provide structure 10 with improved shock wave absorption.

In low temperature environments, it is believed that the same combination of gap 26, bounded by the thin backing layer 28 provide structure 10 with improved resolution of the polycarbonate cracking mechanism discussed above and, thus, improved ability for the backing layer to stop fragments.

Referring to FIG. 3, a comparison of transparent laminate structures having different configurations, under multiple strikes and at varied temperatures, is shown. Here, comparisons were made in structures having gap 26 consisting of air, gap 26 consisting of compliant polymers, structures that lacked the gap, and other structure designs. It can be seen from FIG. 3 that, when structure 10 has gap 26 of air, the gap should be greater than 0.25 inches and preferably 0.5 inches or larger.

Without wishing to be bound by any particular theory, it is believed that in order to encourage specific scooping and burrowing behavior, described later, gap 26 should be approximately half to one and a half times the length of the projectile core. These dimensions can be adjusted based on the elasticity of spacer 26-1 forming gap 26.

It has been surprisingly determined by the present disclosure that the placement of a thin backing layer 28 at the rear face 30 of front section 20, with gap 26 immediately behind the backing layer so that the backing layer is unsupported, is particularly effective in projectile turning.

It has further been determined by the present disclosure that the low temperature, multi-strike capability of structure 10 is improved by providing at least one transparent polymer layer such as, but not limited to, polycarbonate on each side of gap 26. Thus, in addition to backing layer 28 at a rearward face 30 of front section 20, structure 10 further includes at least one polymer layer 38 at a forward face 40 of rear section 22.

In this manner, structure 10 includes at least one polymer layer 28 bounding the front side of the lower density middle section 24 and at least one polymer layer 38 bounding the rear side of the lower density middle section 24.

Polymer layer 38 is a ductile transparent layer configured to retain within rear section 22 glass particles from impact resistant layers 46 discussed in more detail below. In a preferred embodiment, layer 38 has a thickness of about 0.060 inches, but not more than 0.125 inches as seen from FIG. 3.

Further, layer 28-1 preferably has a thickness of up to about 0.22 inches, while layer 28-2 preferably has a thickness of 0.060 inches and not more than 0.125 inches as also seen from FIG. 3. Thus, polymer layers 28, 38 that bound middle section 24 are surprisingly believed by the present disclosure to encourage scooping and burrowing (i.e., projectile turning) when having a thickness of less than 0.125 inches, preferably 0.063 inches, but not less than a few mils.

In one particular embodiment of the present disclosure, layers 28 and 38 are made of polycarbonate coated with an anti-reflection coating (not shown) configured to minimize light losses and visual distraction due to light reflections in gap 26. For example, it is contemplated by the present disclosure for faces 30, 40 of polymer layers 28 and 38, respectively, to have a commercially available siloxane coated thereon.

It has also been determined by the present disclosure that the extreme temperature, multi-strike capability of structure 10 is improved by providing at least one fiber-reinforced spall layer 42 on the rearward most face of rear section 24, namely at safe face 14. Spall layer 42 is made of high strength glass fibers reinforcing a transparent polymer where interfaces between the fiber and the polymer has been treated to match indices of refraction sufficient for transparency. Fiber shape may also be made elliptical for better transparency. Silsesquioxane coatings on the glass fibers enhance transmission in polyurethane and epoxy polymers.

Spall layer 42 is bonded to rear section 24 by relatively thick, soft compliant adhesive layer 44, which is ductile at low temperatures. For example, adhesive layer 44 is between about 0.20 and 0.05 inches thick with about 0.10 inches thick being preferred. Adhesive layer 44 is made of aliphatic polyurethane with retained ductility at low temperatures.

Rear section 22 further includes one or more impact resistant layers 46 (only one shown) and one or more backing plates 48 (only one shown) bonded to one another and polymer layer 38 by interlayers 50.

Impact resistant layer 46 is formed of a material such as, but not limited to borosilicate glass, glass-ceramic, transparent ceramic, brittle transparent polymers such as, but not limited to polymethyl methacrylate (PMMA), transparent polymers having a surface coating, and hard coated soda lime glass. Other glasses such as surface hardened soda lime silicate, lithium aluminosilicate, and aluminosilicate may also be used. Without limiting the scope of the invention, suitable glass ceramic materials include those having a crystalline phase of Beta-quartz, spinel, Beta-willemite, forsterite, spinel solid solution, mullite, and similar glass ceramics known in the art.

Preferably, structure 10 includes a plurality of impact resistant layers 46 is made of material such as, but not limited to borosilicate glass, glass-ceramic, transparent ceramic, brittle transparent polymers such as, but not limited to polymethyl methacrylate (PMMA), transparent polymers having a surface coating such as, but not limited to Exatec® coating commercially available from SABIC plastics, and hard coated glass, hard coated glass-ceramic, or surface treated glass, glass-ceramic, or transparent ceramic. Other glasses such as surface hardened soda lime silicate, lithium aluminosilicate, and aluminosilicate may also be used. Without limiting the scope of the invention, suitable glass ceramic materials include those having a crystalline phase of Beta-quartz, spinel, Beta-willemite, forsterite, spinel solid solution, mullite, and similar glass ceramics known in the art. The fragments of layers 46, when impacted by projectile 16, are retained within rear section 22 by ductile layer 38.

Backing plate 48 is formed of a material such as, but not limited to transparent polymers such as polycarbonate, polymethyl methacrylate (PMMA), polyurethane, nylon, polyimides, with or without fiber reinforcement. Polymethyl methacrylate (PMMA), or poly(methyl 2-methylpropenoate), is the polymer of methyl methacrylate. The thermoplastic and transparent plastic is sold by the trade names PLEXIGLASS®, PLEXIGLAS-G®, R-CAST®, PERSPEX®, PLAZCRYL®, LIMACRYL®, ACRYLEX®, ACRYLITE®, ACRYLPLAST®, ALTUGLAS®, POLYCAST® and LUCITE®. It is often also commonly called acrylic glass or simply acrylic. Polycarbonate is sold by the trade names LEXAN® from General Electric, CALIBRE® from Dow Chemicals, MAKROLON® from Bayer and PANLITE® from Teijin Chemical Limited. A suitable transparent polyurethane is sold by BAE systems under the trade name CrystalGuard®. Transparent polyamides are sold by Evonik under the trade name Trogamide®. These transparent polymers may be microcrystalline where the crystallites are so small light passes through, such as Trogamide CX.

It should be recognized that rear section 22 is shown by way of example only as having a single layer 46 and a single plate 48. However, it is contemplated by the present disclosure for rear section 22 to have any desired number of layers 46 and/or plates 48 and for these layers and plates to be formed of any desired material.

Interlayer 50 can be made of any desired transparent adhesive such as, but not limited to aliphatic polyether polyurethanes or poly(vinyl butyral)s, ethylene/methacrylic acid copolymer, silicone, epoxy, and any combinations thereof Other suitable transparent polymer interlayers 32, 50 include transparent thermoplastics or thermosets such as acrylonitrile-butadiene-styrene (ABS), acetal resins, cellulose acetate, cellulose acetate butyrate, cellulose acetate propionate, cellulose tri-acetate, acrylics and modified acrylics, allyl resins, chlorinated polyethers, ethyl cellulose, epoxy, fluoroplastics, ionomers (like Dupont Surlyn A), melamines, nylons, parylene polymers, transparent phenolics, phenoxy resins, polybutylene, polycarbonates, polyesters, polyethylenes, polyphenylenes, polypropylenes, polystyrenes, polyurethanes, polysolphones, polyvinyl-acetate, polyvinyl butyral, silicones, as well as styrene-acrylonitride and styrene-butadiene copolymers.

In use, structure 10 achieves multi-hit capability in the following manner. Front section 20 defeats impact of a first projectile 16, which polycarbonate layers 28-1, 28-2 and interlayer 32 resolving and/or mitigating the aforementioned polycarbonate fracture mechanism. A second projectile 16 will penetrate front section 20, but will typically enter second section 22, turn 180 degrees, and exit the second section back toward the first section, scooping, or burrowing just under surface 40 of rear section 22 fracturing only the first one or two layers 46 in the rear section.

Without wishing to be bound by any particular theory, it is believed that the scooping of the second projectile 16 is caused by rebound of the polycarbonate of front section 20 occurring coincident with the second projectile entering rear section 24, which imparting a change in angular momentum to the second projectile.

Targets embodying the present disclosure, when tested at ambient temperature, have shown projectile imprints on both faces 30, 40. It is believed that this dual imprint illustrates that faces 30, 40 deformed on to the projectile 16 at the same time.

When second projectile 16 scoops, damage in to the rear section 22 has been observed by the present disclosure as being minimal with very few if any circumferential cracks and short radial cracks. Thus, on impact by a third projectile 16, the area of rear section 22 impacted by the third projectile is often undamaged such that the third projectile also exhibit scooping or burrowing, leaving one or more layers 46 of glass in the rear section uncracked.

Preferably, layers 46 are glass layers having a thickness of 0.3 to 1 inch thick for each layer, with the combination of layers creating an overall thickness of about 1 inch, which has been determined to provide sufficient stiffness to promote the aforementioned scooping and burrowing behavior. Here, it is preferred for spall layer 42 to have an elastic modulus at least an order of magnitude less than layers 46.

Spacers 26-1 are made of materials and are configured with dimensions (e.g., thickness and width) effective to provide sufficient elasticity allow the aforementioned scooping and burrowing behavior to occur consistently.

In one embodiment, spacer 26-1 is about 0.75 inches wide, about 0.25 inches thick, and is constructed of a material having sufficient elastic stiffness such as greater than about Shore A hardness of 45.

The elastic resilience of spacer 26-1 is believed by the present disclosure to be an important property that enables rebound of polycarbonate backing layer 28 on front section 20. Elastic resilience of spacer 26-1 can be thought of as its elastic modulus multiplied by its width. In an embodiment where spacer 26-1 has a thickness of about 0.5 inches and the rebounding polycarbonate, layer 28-1 has a thickness of 0.063 inches we have determined that an effective spacer has an elastic resilience of greater than 110 psi-inch.

In another embodiment, spacer 26-1 is made of a closed cell polyurethane foam having which may or may not include a desiccant such as, but not limited to, the a tri-seal material commercially available from EdgeTech.

While spacer 26-1 is disclosed by way of example as having desiccant incorporated into the spacer, it is also contemplated by the present disclosure for any portion of middle section 24 to include or be able to receive a separate desiccant.

Of course, other materials meeting the aforementioned dimensions and elasticity (e.g., greater than 45 Shore A) are contemplated for use by the present disclosure including, but not limited to metals, polycarbonates, glasses, and others.

Additionally, it is contemplated that spacer 26-1 can be commercially available polymer tapes, a metal spacer (for example an extruded aluminum profile), a modular frame (front/back window potted in individual frames which are bolted together), or a frame having separate mounting points for each window (for example innermost window can be slightly smaller, and sit in recess). Such a framing and space approach provides modularity so the window can be configured to the threat, even in the field.

Referring now to FIG. 2, an alternate embodiment of structure 10 is shown. For ease of discussion, only front and middle sections 20, 22 are shown. Here, front section 20 includes a single polycarbonate layer 28 at rearward face 30 of the front section, where layer 28 is preferably about 0.125 inches thick.

Specifications for two preferred embodiments; one with an air space and one with a thick compliant layer, and the process for manufacturing these embodiments are summarized in Table 1 and 2 below.

TABLE 1

| LAY-UP DESIGN FROM STRIKE FACE 12 TO SAFE FACE 14 | Thickness (inches) | Thickness (mm) | Weight (psf) |
|---|---|---|---|
| Borofloat | 0.35 | 8.89 | 4.11 |
| polyurethane | 0.023 | 0.5842 | 0.14 |
| Glass Ceramic | 0.312 | 7.9248 | 4.094 |
| polyurethane | 0.023 | 0.5842 | 0.14 |
| Low Iron Soda lime glass | 0.487 | 12.3698 | 6.194 |
| polyurethane | 0.023 | 0.5842 | 0.14 |
| Low Iron Soda lime glass | 0.487 | 12.3698 | 6.194 |
| polyurethane | 0.023 | 0.5842 | 0.14 |
| Low Iron Soda lime glass | 0.297 | 7.5438 | 4.13 |
| polyurethane | 0.023 | 0.5842 | 0.14 |
| polycarbonate | 0.229 | 5.8166 | 1.475 |
| polyurethane | 0.023 | 0.5842 | 0.14 |
| Polycarbonate | 0.063 | 1.6002 | 0.393 |
| Space | 0.323 | 8.2042 | 0.4 |
| Polycarbonate | 0.063 | 1.6002 | 0.393 |
| polyurethane | 0.023 | 0.5842 | 0.14 |
| Low Iron Soda lime glass | 0.487 | 12.3698 | 6.194 |
| polyurethane | 0.023 | 0.5842 | 0.14 |
| Low Iron Soda lime glass | 0.487 | 12.3698 | 6.194 |
| polyurethane | 0.023 | 0.5842 | 0.14 |
| Low Iron Soda lime glass | 0.297 | 7.5438 | 4.13 |
| polyurethane | 0.023 | 0.5842 | 0.14 |
| polycarbonate | 0.229 | 5.8166 | 1.475 |
| polyurethane | 0.023 | 0.5842 | 0.14 |
| polycarbonate | 0.229 | 5.8166 | 1.475 |
| Low Temperature Ductile polyurethane | 0.1 | 2.54 | 0.56 |
| Polycarbonate | 0.117 | 2.9718 | 0.78 |
| TOTAL | 4.81 | 122.174 | 49.731 |

TABLE 2

| LAY-UP DESIGN FROM STRIKE FACE 12 TO SAFE FACE 14 | Thickness (inches) | Thickness (mm) | Weight (psf) |
|---|---|---|---|
| Borofloat | 0.35 | 8.89 | 4.11 |
| polyurethane | 0.023 | 0.5842 | 0.14 |
| Glass Ceramic | 0.312 | 7.9248 | 4.094 |
| polyurethane | 0.023 | 0.5842 | 0.14 |
| Low Iron soda lime glass | 0.487 | 12.3698 | 6.194 |
| polyurethane | 0.023 | 0.5842 | 0.14 |
| Low Iron soda lime glass | 0.487 | 12.3698 | 6.194 |
| polyurethane | 0.023 | 0.5842 | 0.14 |
| Low Iron soda lime glass | 0.297 | 7.5438 | 4.13 |
| polyurethane | 0.023 | 0.5842 | 0.14 |
| polycarbonate | 0.229 | 5.8166 | 1.475 |
| Transparent Gel | 0.1 | 2.54 | 0.56 |
| Polycarbonate (PC) | 0.063 | 1.6002 | 0.393 |
| polyurethane | 0.023 | 0.5842 | 0.14 |
| Low Iron soda lime glass | 0.487 | 12.3698 | 6.194 |
| polyurethane | 0.023 | 0.5842 | 0.14 |
| Low Iron soda lime glass | 0.487 | 12.3698 | 6.194 |
| polyurethane | 0.023 | 0.5842 | 0.14 |
| Low Iron soda lime glass | 0.297 | 7.5438 | 4.13 |
| polyurethane | 0.023 | 0.5842 | 0.14 |
| polycarbonate | 0.229 | 5.8166 | 1.475 |
| polyurethane | 0.023 | 0.5842 | 0.14 |
| polycarbonate | 0.229 | 5.8166 | 1.475 |
| Low Temperature Ductile polyurethane | 0.1 | 2.54 | 0.56 |
| polycarbonate | 0.063 | 1.6002 | 0.393 |
| TOTAL | 4.447 | 112.9538 | 48.971 |

During manufacture of structure 10, the pre-laminate structure is wrapped in a vacuum bag typically including a layer of woven cloth with an embedded release agent immediately against the structure, then a layer of high loft matting as a breather cloth that allows air and gasses to escape, then the final plastic bagging film that is impervious to air and allows a vacuum to be pulled on the parts drawing out the air and confining the stack. Vacuum is typically pulled to a level of −26 to −28 millimeters (mm) of mercury (Hg). The vacuum bagged pre-laminate structure is loaded into an autoclave, reconnected to vacuum, and subjected to heat and pressure to melt the adhesive interlayers and cause them to bond all the other layers together. The specific time, temperature and pressure cycles are selected in accordance with the specific interlayers, thicknesses, and ballistic requirements.

Figure 4:
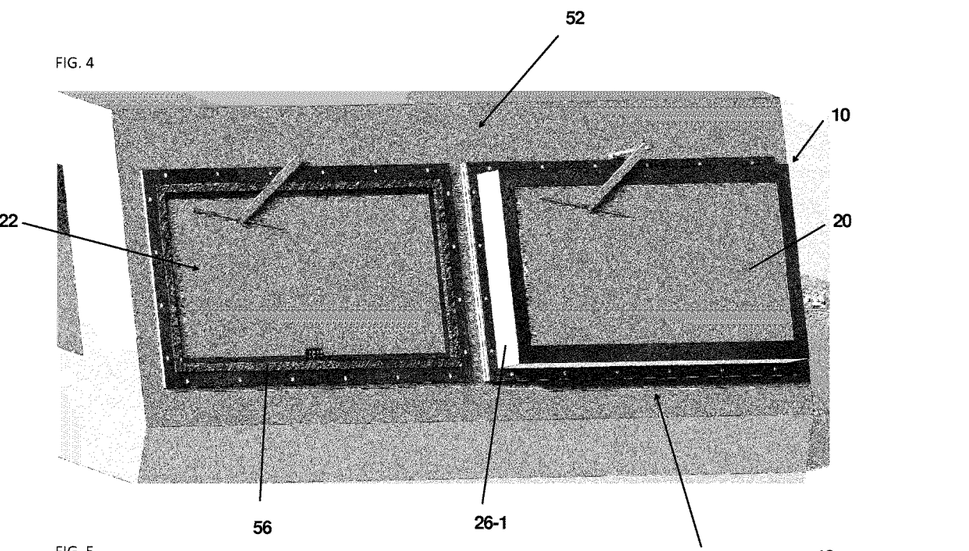
FIG. 4 is a perspective view of an exemplary embodiment of the laminate structure according to the present disclosure in use.
Figure 5:
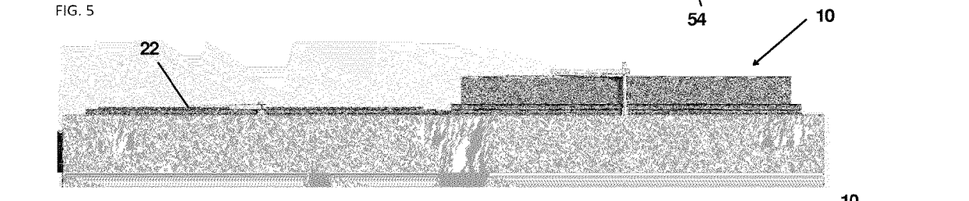
FIG. 5 is a side view of the laminate structure of FIG. 4.
Figure 6:
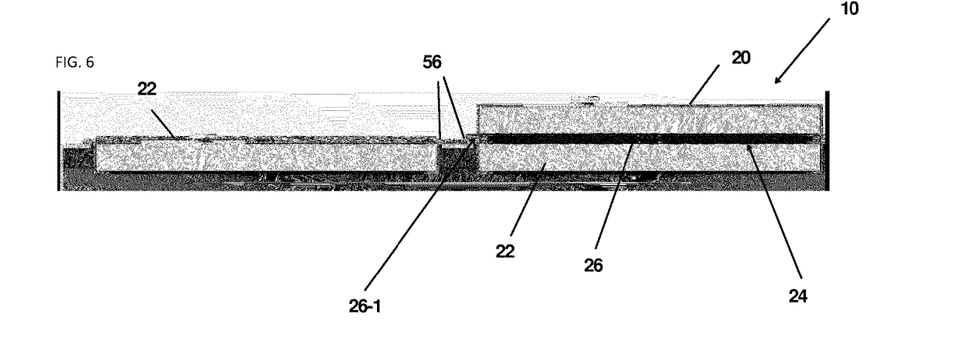
FIG. 6 is a cross section of the laminate structure of FIG. 4.

Turning now to FIGS. 4 through 6, a particular embodiment of structure 10 is shown in use with a vehicle 52 that includes rear section 22 incorporated into the vehicle. Here, vehicle 52 is shown having only rear section 22 on the left hand side and having the addition front and middle sections 20, 24 on the right hand side. In this embodiment, structure 10 is shown in modular form with front and middle sections 20, 24 as a unitary structure or subassembly 54 that can be secured to the vehicle 52 over rear section 22 to provide the desired gap 26.

One benefit of structure 10 that becomes apparent is the ability to manage aggressive de-icing requirements. Here, the thinner front section 20 backed by middle section 24, which has very low mass, can more easily be de-iced as compared to prior art solid structures.

De-icing is typically performed by wires laid down in a network in a polymer film or layer (not shown). The polymer film is incorporated into one of the interlayer plies near the front and usually directly under the first layer of the structure. The de-icer wires are energized through a circuit of the vehicle often 26 volts DC, and draw 18 amps or possibly more if available. Other de-icer approaches use a thin layer of conductive coating such as tin oxide or indium tin oxide deposited on a transparent plastic film. When either the wires or conductive film are exposed to a current the resistance of the wires or films causes them to heat up and melt the ice. Sheet resistance of these interlayers are 500-200 ohms/square typically with some special designs being preferable lower at less than 10 ohms/square. Even with these low sheet resistances, the de-iciers are insufficient to de-ice quickly from low temperatures, such as 30 minutes from −40 deg C. in heavily armored solid (i.e., those that lack gap 26) window laminate structures.

In contrast, structure 10 according to the present disclosure includes the thin front section 20, followed by low mass middle section 24, that enables the use of readily available de-icing solutions to de-ice in less than 30 minutes from −31 deg C. and lower temps. This de-icing characteristic is further enabled by a heat reflective coating on the strike face side of the thin polymer sheet that is bonded to the safe side of the first thin section, or preferably that is deposited on the safe side of the de-icier interlayer.

Another benefit of structure 10 that becomes apparent is the ability to easily replace damaged front section 20. For example, it is common for front section 20 to sustain damage from scratches or rocks or low caliber bullets and low speed fragments that can affect visibility of structure 10, but do not affect rear section 22. Advantageously, structure 10 allows for the damaged front section 20 to be easily replaced and the vehicle to be more quickly returned to service.

In some embodiments, structure 10 includes an uppermost impact resistant layer 34 that provides resistance to cracking from small object impacts such as rocks which will not penetrate the transparent laminate structure 10 but may crack or damage strike face 12. For example, it is contemplated by the present disclosure for layer 34 to be made of glass or glass-ceramics, particularly glass or glass-ceramics having a chemically strengthened ion exchange layer (not shown) at strike face 12. Preferably, the chemically strengthened ion exchange layer on layer 34 has a thickness of 100 microns or greater. Of course, it is contemplated by the present disclosure for layer 34 to have any abrasion resistant layer or coating such as, but not limited to for instance diamond like coatings, silicon nitride, or any other adherent and transparent ceramic coating.

Rear section 22 is installed in the frame 56 normally present in prior art vehicles 52. Advantageously, spacer 26-1 rests on and is supported by frame 56 and not by rear section 22. Thus, impacts and the associated shock waves imparted on front section 20 of structure 10 by projectile 16 are transferred to frame 56 and not to rear section 22. Stated another way, rear section 22 is isolated from damage by projectiles 16 by spacer 26-1 until the projectile penetrates front section 20 and middle section 24.

Preferably, rear section 22 is removably installed in the frame 56 and subassembly 54 is removably secured to vehicle 52 with gap 26 forming a hermetically sealed space. In this manner, structure 10 allows field damage or battle damage to front and/or rear sections 20, 22 to easily be repaired. Often, the damage does not go through front section 20 such that structure 10 greatly reduces the cost to repair vehicle 52 by requiring replacement of only part of structure 10 (i.e., subassembly 54) instead of the whole structure.

The modular nature of structure 10 also makes it scalable depending on the expected threat. For example, structure 10 can be configured to accept multiple subassemblies 54, stacked one on another with gap 26 therebetween each subassembly.

It should also be noted that the terms "front", "rear", "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the present disclosure.

What is claimed is:

1. A transparent laminate structure, the structure consisting of and in consecutive order:
    an impact resistant layer of borosilicate glass having a strike face on a front side;
    a first layer of adhesive;
    a second layer of adhesive having a Shore A hardness that is less than a Shore A hardness of the first layer of adhesive;
    a first polycarbonate layer;
    an adhesive aliphatic polyether film;
    a second polycarbonate layer;
    a spacer; and
    a third polycarbonate layer separated from the second polycarbonate layer by the spacer and forming a gap between the second polycarbonate layer and the third polycarbonate layer,
    wherein the gap is hermetically sealed by the spacer.

2. The transparent laminate structure of claim 1, wherein the gap comprises a transparent gas selected from the group consisting of air, nitrogen, argon, helium, oxygen, carbon dioxide, propane, and any combinations thereof.

3. The transparent laminate structure of claim 1, wherein the gap comprises a transparent liquid or gel.

4. The transparent laminate structure of claim 1, wherein the gap has a thickness of at least 0.5 inches.

5. The transparent laminate structure of claim 1, wherein the strike face comprises a de-icing layer.

6. The transparent laminate structure of claim 1, wherein the first or the second polycarbonate layer comprises a fiber reinforced polymer.

7. The transparent laminate structure of claim 1, wherein the impact resistant layer comprises a plurality of impact resistant layers.

8. The transparent laminate structure of claim 1, wherein the second polycarbonate layer has a thickness of up to about 0.22 inches, and wherein the first polycarbonate layer has a thickness of up to about 0.063 inches.

9. The transparent laminate structure of claim 1,
    wherein the impact resistant layer, the first layer of adhesive, the second layer of adhesive, the first polycarbonate layer, the adhesive aliphatic polyether film, and the second polycarbonate layer form a front section of an integral subassembly removably secured to a frame holding a rear section comprising the third polycarbonate layer so as to form a hermetic space between the front and rear sections.

10. The transparent laminate structure of claim 9, further comprising a middle section defined by the spacer, the middle section further comprising a desiccant.

11. A transparent laminate structure assembly, the assembly comprising:
a frame located on a vehicle;
a rear section having at a forward face at least one polymer layer of polycarbonate, the rear section being removably installed in the frame;
a front section, consisting of, in order, a strike face on a front side of an impact resistant layer of borosilicate glass, a first layer of adhesive, a second layer of adhesive having a Shore A hardness less than a Shore A hardness of the first layer of adhesive, a first polycarbonate layer, an adhesive aliphatic polyether film, and a second polycarbonate layer; and
a middle section having a spacer that is securable to the frame so that the front and rear sections are securable to one another with a hermetically sealed gap between the front and rear sections.

12. The assembly of claim 11, wherein the gap comprises a transparent liquid or gel.

13. The assembly of claim 11, wherein the gap has a thickness of at least 0.5 inches.

14. The assembly of claim 11, wherein the first layer of adhesive has a modulus of elasticity that is higher than a modulus of elasticity of the second layer of adhesive.

15. The assembly of claim 11, wherein the second polycarbonate layer has a thickness up to about 0.22 inches.

16. The assembly of claim 15, wherein the first polycarbonate layer has a thickness up to about 0.063 inches.

17. The assembly of claim 11, wherein the middle section further comprises a desiccant.

18. The transparent laminate structure of claim 1, wherein the adhesive is at least one polymer selected from the group consisting of: an aliphatic polyether polyurethane, a poly(vinyl butyral), an ethylene/methacrylic acid copolymer, silicone, and an epoxy.

19. The transparent laminate structure of claim 1, wherein the first layer of adhesive has a Shore A hardness of 90 or higher.

20. The transparent laminate structure of claim 1, wherein the second layer of adhesive has a Shore A hardness of 79 or less.

21. The transparent laminate structure of claim 1, wherein the first adhesive layer has a modulus of elasticity that is higher than a modulus of elasticity of the second adhesive layer.

22. The assembly of claim 11, wherein the first adhesive layer has a Shore A hardness of 90 or higher and the second adhesive layer has a Shore A hardness of 79 or less.

* * * * *